(No Model.)
W. F. BLACK.
AXLE ATTACHMENT.
No. 431,504. Patented July 1, 1890.
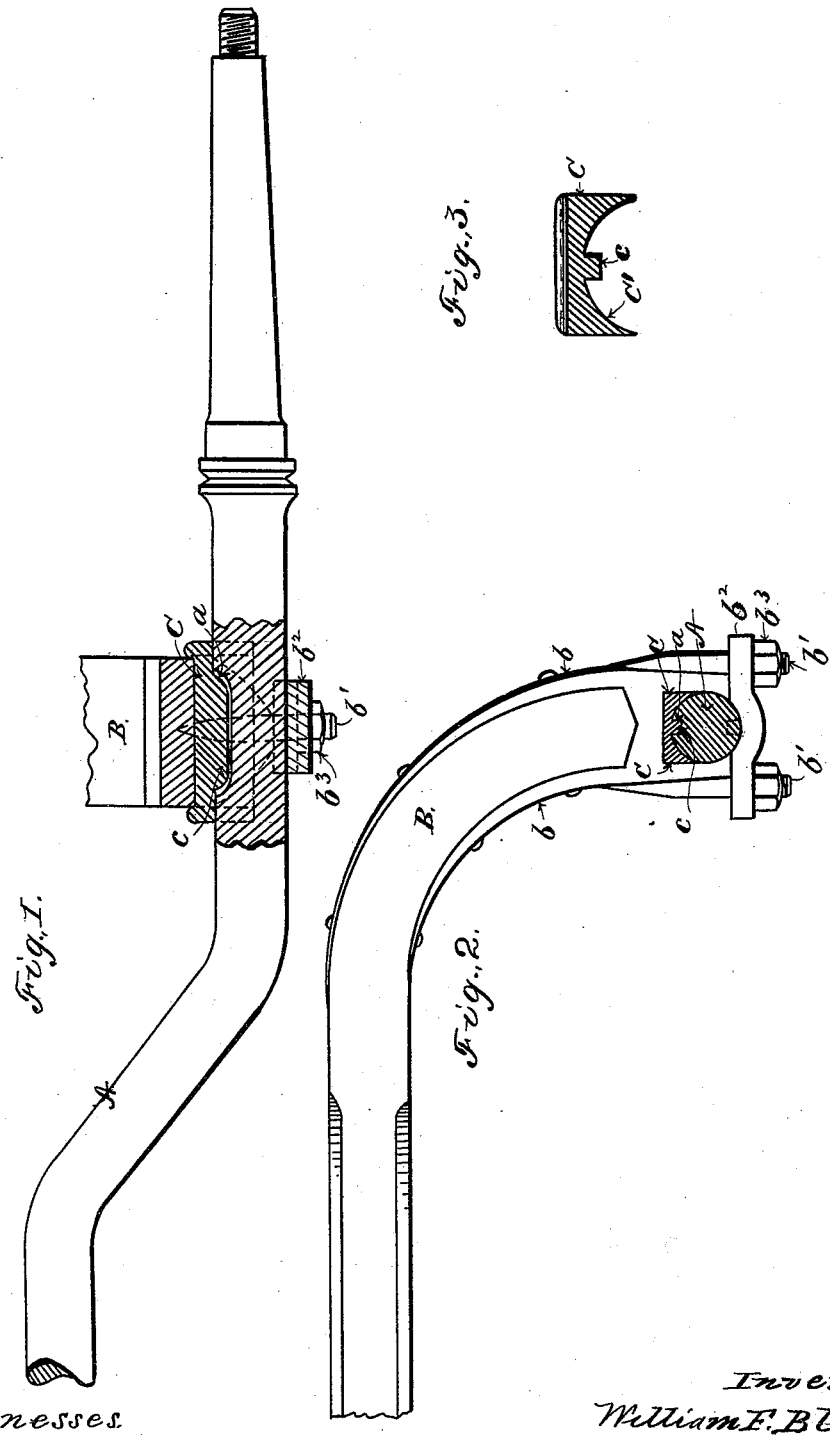
Witnesses
W. R. Edelen.
Geo. W. King.
Inventor,
William F. Black,
By Leggett & Leggett
Att'ys.

UNITED STATES PATENT OFFICE.

WILLIAM F. BLACK, OF CLEVELAND, OHIO.

AXLE ATTACHMENT.

SPECIFICATION forming part of Letters Patent No. 431,504, dated July 1, 1890.

Application filed April 26, 1889. Serial No. 308,714. (No model.)

*To all whom it may concern:*

Be it known that I, WILLIAM F. BLACK, of Cleveland, in the county of Cuyahoga and State of Ohio, have invented certain new and useful Improvements in Axle Attachments; and I do hereby declare the following to be a full, clear, and exact description of the invention, such as will enable others skilled in the art to which it pertains to make and use the same.

My invention relates to improvements in axle attachments for vehicles; and it consists in certain features of construction and in combination of parts hereinafter described, and pointed out in the claim.

In the accompanying drawings, Figure 1 is a side elevation. Fig. 2 is an end elevation in section. Fig. 3 is an end elevation in section of the clip-block or saddle detached from the axle, Figs. 2 and 3 being enlarged to approximately full size for very light vehicles.

At the present time and for light work, more especially of the two-wheeled variety, the round axles without wooden axle-beds are desirable, and for rigidly attaching the thills or other parts to such rounded axles I provide as follows:

A represents the axle, B a thill, and C a clip-block or saddle for, in the present case, the butt of the thill to rest on, this block or saddle when used for a thill being embraced by the thill-iron $b$. Block C has a curved seat $C'$, adapted to fit the axle, and to prevent the saddle from turning on the axle the latter is provided with a slight longitudinal groove $a$ on top, and the saddle C is provided with a corresponding tongue $c$, adapted to fit groove $a$. Of course block or saddle C could have a groove corresponding with groove $a$ of the axle, and a spline inserted in these grooves could be made to answer the purpose, in which case the grooved wall of the saddle would have to be made thicker than shown, and such extra thickness would be somewhat objectionable. Thill-irons $b$ terminate in screw-threaded ends $b'$, with cross-bars $b^2$ and nuts $b^3$ to complete the clip. In case other parts of the vehicle are to be fastened to the axle adjacent the thills the saddle can be made long enough to receive such other parts, or if such parts are located more remote from the thills separate saddles may be used for securing the separate parts, if need be, in which case a clip adapted for the purpose will of course be employed. When the parts are assembled and nuts $b^3$ are tightened to bring the cross-bar $b^2$ firmly against the under side of the axle, the thill or whatever part is attached is firmly and strongly held in place as against turning on the axle or moving endwise on the axle; also saddle C and clip reenforce the axle, so that the latter seldom or ever breaks within the limits of the saddle.

What I claim is—

The combination, with an axle having a curved upper face, the latter having an elongated recess therein, of a thill and thill-iron, a cross-bar for locking the thill-iron to the axle, and a block interposed between the thill and axle and having a flat upper face and a curved lower face, the latter having an elongated tongue to fit within the recess in the axle, substantially as set forth.

In testimony whereof I sign this specification, in the presence of two witnesses, this 16th day of February, 1889.

WILLIAM F. BLACK.

Witnesses:
CHAS. H. DORER,
ALBERT E. LYNCH.